Jan. 30, 1962    H. MULTHOPP    3,018,982
DUCTED FAN AIRCRAFT INCORPORATING A BLOWN FLAP ARRANGEMENT
Filed Feb. 25, 1957    7 Sheets-Sheet 1

Fig.1.

INVENTOR
HANS MULTHOPP
BY Julian C. Renfro
ATTORNEY

INVENTOR
HANS MULTHOPP

Fig. 6.

INVENTOR
HANS MULTHOPP 3,018,982
DUCTED FAN AIRCRAFT INCORPORATING
A BLOWN FLAP ARRANGEMENT
Hans Multhopp, Overlea, Md., assignor to Martin-Marietta Corporation, a corporation of Maryland
Filed Feb. 25, 1957, Ser. No. 641,882
17 Claims. (Cl. 244—15)

This invention relates to a propulsion system for an aircraft, and more particularly to a ducted fan arrangement utilized in the wings of an aircraft in such a manner as to obtain the advantages of a ducted fan engine as well as the advantages associated with the use of jet flaps.

In the aircraft of today, probably the most common propulsion arrangements are those in which a propeller driven by the power plant furnishes the thrust, and those in which turbojet engines utilizing compressor, burners and turbine are employed, with the exhaust gases flowing from the turbine through the exhaust nozzle of the jet engine furnishing the thrust for the aircraft. In a propeller driven aircraft, the propeller acts upon large air mass, with the increment of velocity being added to the air mass being comparatively small. This arrangement is best adapted for low flight speeds. In contrast with this, a turbojet engine consumes and thereby acts upon a comparatively small air flow, but the velocity change imparted to the air is quite large. This is particularly advantageous for high speed aircraft because of the moderate weight of the jet engine.

The ducted fan engine is a compromise between the turbojet engine, which is inefficient at low speeds, and the turboprop engine, which is too heavy at high speeds. The most common embodiment of a ducted fan engine utilizes a duct arrangement disposed about the periphery of a gas generator such as a turbojet engine, with a large supplemental compressor or fan driven by the turbine shaft of the engine typically being employed to pump secondary air through the duct arrangement. This secondary air usually makes its exit in such a manner as to surround the hot gases from the exhaust nozzle of the engine.

Conventional ducted fan engines may vary widely in their design range, and the choice of secondary air to primary air ratio depends largely on the speed regime at which it is desired to fly. At one extreme is a ducted fan engine comparatively close to a turboprop arrangement, utilizing a large mass flow through a low pressure ratio fan. On the other extreme is a ducted fan engine comparatively close to a turbojet arrangement, utilizing a moderate mass flow through a high pressure ratio fan. Each of these alternative arrangements has limitations from the standpoint of thrust and specific fuel consumption when being operated outside its primary design range; however, they are usually still better in that respect than either the true jet or the propeller engine.

According to the present invention, a ducted fan type propulsion system is provided for use in aircraft in the intermediate speed range, but which will be operative over a wide range of speeds. These results are obtained by the use of a ducted fan arrangement designed to reside entirely within the limited geometry of a high speed aircraft, thereby avoiding the drag at high speeds caused by the bulkiness of prior art ducted fans. So that the present arrangement will have satisfactory low speed performance, the jet flap principle is advantageously employed so that during takeoff, for example, the coefficient of lift of the wings will be substantially increased.

According to the best known examples of a jet flap arrangement, products of combustion from a jet engine are exhausted through a long flat nozzle extending adjacent the trailing edge of a wing so that the exhaust gases will flow over the upper surface of the flap, thereby augmenting the lift by inducing circulation about the wing.

As an example, my co-pending application entitled Wing Arrangement filed January 27, 1956 and bearing Serial Number 561,809 now Patent No. 2,964,264 describes and claims a particular jet flap arrangement.

According to the present invention, the instant ducted fan arrangement consists of a number of individual air pumping units spaced along the span of the wing in such a manner as to inhale secondary air through forwardly directed inlets in the wing and expel the secondary air in such a manner as to provide considerable thrust. The size of these units is sufficiently small that they can be easily fitted into wings of conventional thickness, and since the secondary air pumped by these units is not combusted, no cooling problem is presented to the structural design on the wing. In this manner, the present ducted fan arrangement provides greatly increased thrust and lower specific fuel consumption for an aircraft so equipped, as well as increased lift characteristics for takeoff. These advantages are obtained without any increase in frontal area, and with but small increase in weight.

More specifically, a plurality of comparatively small fans or compressors may be placed at spaced locations along the wings of an aircraft, and arranged to inhale secondary air from the forward part of the wing and exhale this air over the upper surface of the wing flaps so as to create a jet flap arrangement. These compressors may be driven in rotation by a common shaft extending substantially longitudinally of the wing with a free turbine driven by the exhaust gases of the principal jet engine (or engines) being employed to drive the shaft. Since the free turbines are approximately the same size as the compressors located in the wings, they may turn at the same speed as the compressors, and no reduction gear is necessary.

The basic gas generators, which could be ordinary jet engines, may be located at any of a number of locations within the wings or fuselage, with the arrangement in each instance being such that the free turbine for driving the compressors of each wing is disposed in the path of travel of the exhaust products from the engine so that the full capabilities of the system will be realized. A single jet engine placed in the fuselage may be employed, or as an alternative, a plurality of engines utilized; as a further example, at least one jet engine may be mounted in a rearwardly facing, opposed relation to a conventionally placed forwardly disposed engine in such a manner that their exhaust gases will mingle and then pass through free turbines used to drive the compressors.

As a still further example, jet engines may be located either adjacent the wing root or the wing tip of each wing, with the free turbines of the wings being mounted on the appropriate end of the compressor shaft so as to be rotated by the exhaust gases of the engines. Each of these alternative arrangements has distinct practical capabilities, for they add only a slight additional weight to the aircraft, while providing approximately twice the thrust that would have been obtained solely by the use of the basic gas generator or generators.

These and other objects, features and advantages of this invention will appear more fully in the specification and drawings of this invention.

Figure 1:
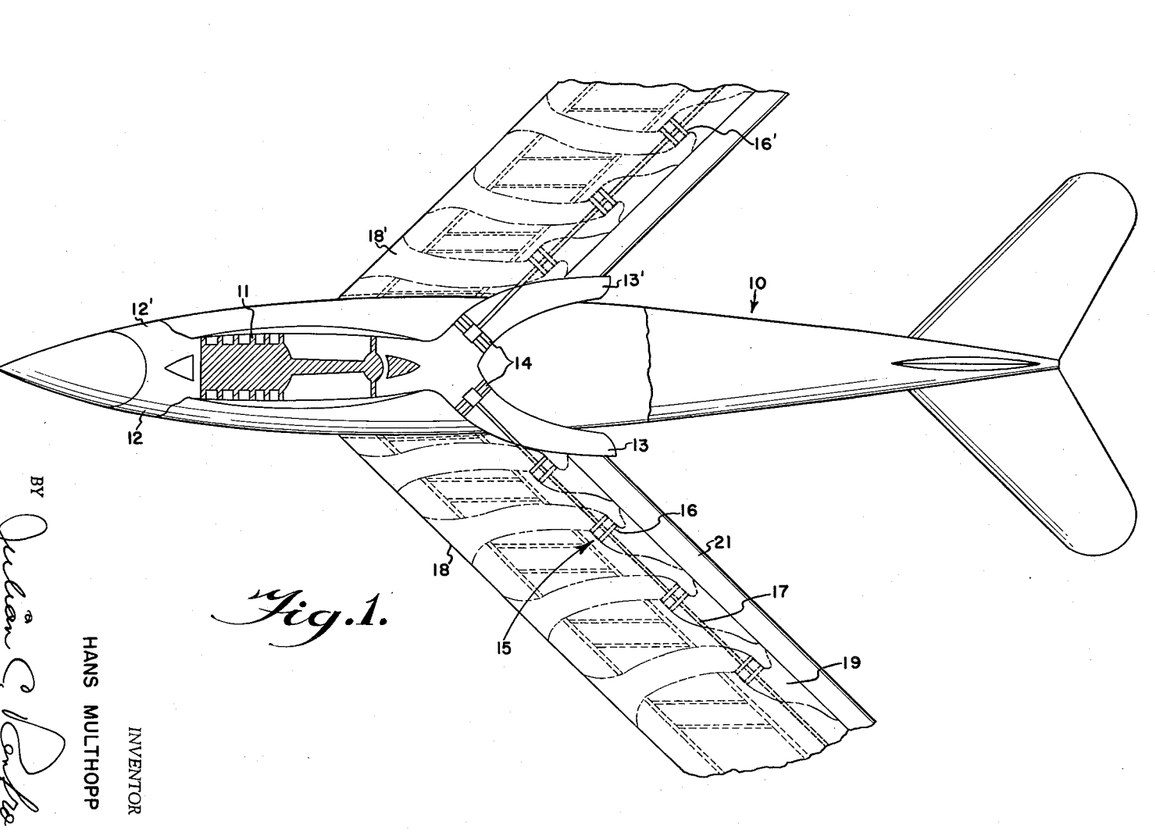
FIGURE 1 is a plan view of one aircraft configuration according to this invention with certain parts cut away to reveal the power plant, compressor, and ducting details.

Referring to FIGURE 1, an aircraft 10 is shown equipped with a jet engine power plant 11 having inlets 12 and 12' and exhaust ducts 13 and 13'. In each exhaust duct a free turbine 14 is mounted upon a rotatable shaft 17 that resides substantially longitudinally in the wing. A compressor arrangement 15 is located in each wing, consisting of a plurality of individual compressor units 16 driven in rotation as the shaft 17 is rotated by free turbine 14. An inlet arrangement 18 is provided in the forward part of the wing for each compressor unit, the inlets preferably being placed in such a manner as to improve the flow of air over the wing. Similarly, the air pumped by each compressor flows through an exhaust duct that is preferably placed in such a manner that the air emanating from each nozzle-shaped outlet 19 flows over the upper surface of the flap 21 of the wing.

The air taken in through intakes 12 and 12' of engine 11 is combusted in the burners of the engine in the conventional manner, with the exhaust products flowing rearwardly through the exhaust ducts 13 and 13'. The free turbines 14 are placed appropriately in the exhaust ducts so as to extract most of the energy contained in the exhaust, this energy then being used to drive the compressor shaft 17. As illustrated, the rotary members of each individual compressor may be mounted directly upon shaft 17. Appropriate shaft seals (not shown) are employed on shaft 17 at locations wherein it passes through structural wing members, ducts etc. so as to eliminate undesired flow of air and/or exhaust products through shaft openings.

Because the compressors 16 are of comparatively small size, they can readily be accommodated within the normal contour of the wing. Each free turbine 14 is approximately the same diameter as the compressors which it drives in rotation, so no reduction gearing is required between the turbine and compressors. The secondary air pumped by the compressors is utilized much in the same general manner as prior art ducted fan arrangements utilize the secondary air flowing around the centrally disposed engine to increase the mass flow. Therefore, the present arrangement enables an aircraft so equipped to obtain substantially more thrust than would have been obtained by the engine 11 acting alone, and the specific fuel consumption of an aircraft according to this invention when traveling at moderate speeds is approximately half that of a similar aircraft not equipped to utilize secondary air.

Figure 2:
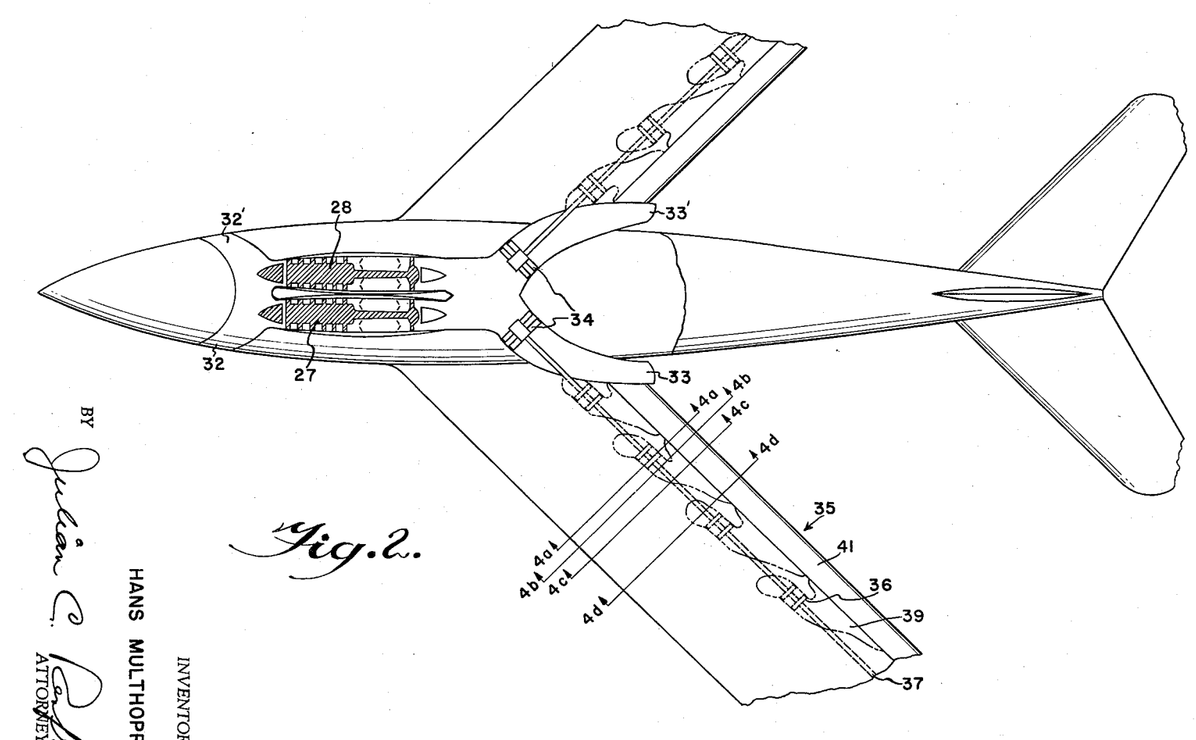
FIGURE 2 is a plan view similar to FIGURE 1, but illustrating the use of a plurality of power plants and a modified inlet duct arrangement for secondary air.

This invention is not in any manner limited to an aircraft powered by a single jet engine, for as shown in FIG. 2, jet engines 27 and 28 may be located in a side by side arrangement in an aircraft fuselage. Although these engines could have separate intake and exhaust arrangements, it is preferable that the engines share the dual intakes 32 and 32' as well as the dual exhaust 33 and 33' so that in the event of failure of one engine, the remaining engine can continue to drive, if desired, both free turbines 34. However, appropriate valving (not shown) could be employed so that the pilot can arrange for some, or even all of the exhaust products of the engine to bypass the free turbines so that the entire propulsive effort of the aircraft can be derived directly from the thrust of the engine, if this be desirable.

Figure 3:
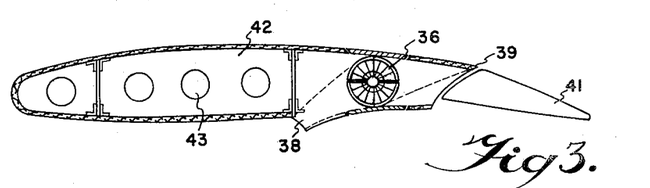
FIGURE 3 is a typical cross-sectional view taken of an aircraft wing according to this invention, illustrating the location of an air compressor in the wing.
Figure 4A:
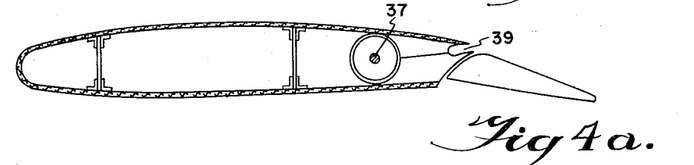
FIGURES 4a through 4d are cross-sectional views taken along lines 4a—4a through 4d—4d on FIG. 2, illustrating certain details associated with the wing compressors.
Figure 4B:
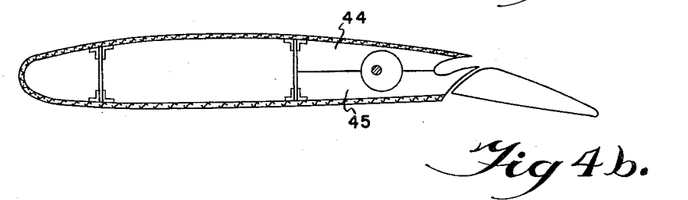
Figure 4C:
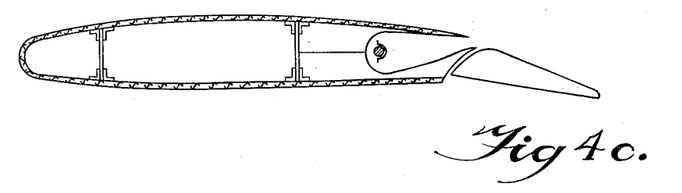
Figure 4D:
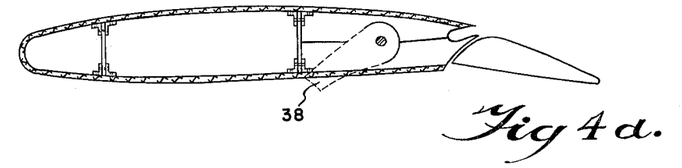

As in the preceding embodiment, each free turbine 34 drives in rotation a shaft 37 that is arranged to drive the individual compressors 36 of the compressor arrangement 35. The secondary air from the compressors is directed through exhaust nozzles 39 preferably over the upper surface of flap or flaps 41 so as to bring about augmentation of lift by inducing circulation around the wing. The embodiment of FIGURE 2 employs a different type of inlet for secondary air than was employed in the embodiment illustrated in FIG. 1; as best seen in FIGS. 3 and 4d, a forwardly directed inlet 38 is provided in substantially the central portion of the lower surface of the wing. Also, engines in addition to engines 27 and 28 could be employed at this location in the fuselage if desired, in which event the additional engine or engines would be in a vertically removed, over-and-under relationship with the engines shown in this modification.

In FIGURE 3 a typical wing-cross-section is shown, with one of the compressors illustrated in some detail. Compressor 36 may be located somewhat aft of the midpoint of the wing substantially as shown, being driven in rotation by shaft 37, inhaling through inlet 38, and exhausting its secondary air through outlet 39 over the upper portion of flap 41. The various FIGURES 4a through 4d show the cross-sectional ducting details of the wings at progressively outward locations of the wing; note FIGURE 2. As may be desired from the standpoint of minimizing weight, the rib 42 may be equipped with a number of lightening holes 43. So that the components of the inlet and outlet ducts can be easily fabricated, the ducting may be constructed in two halves, upper duct section 44 and lower duct section 45.

Figure 5:
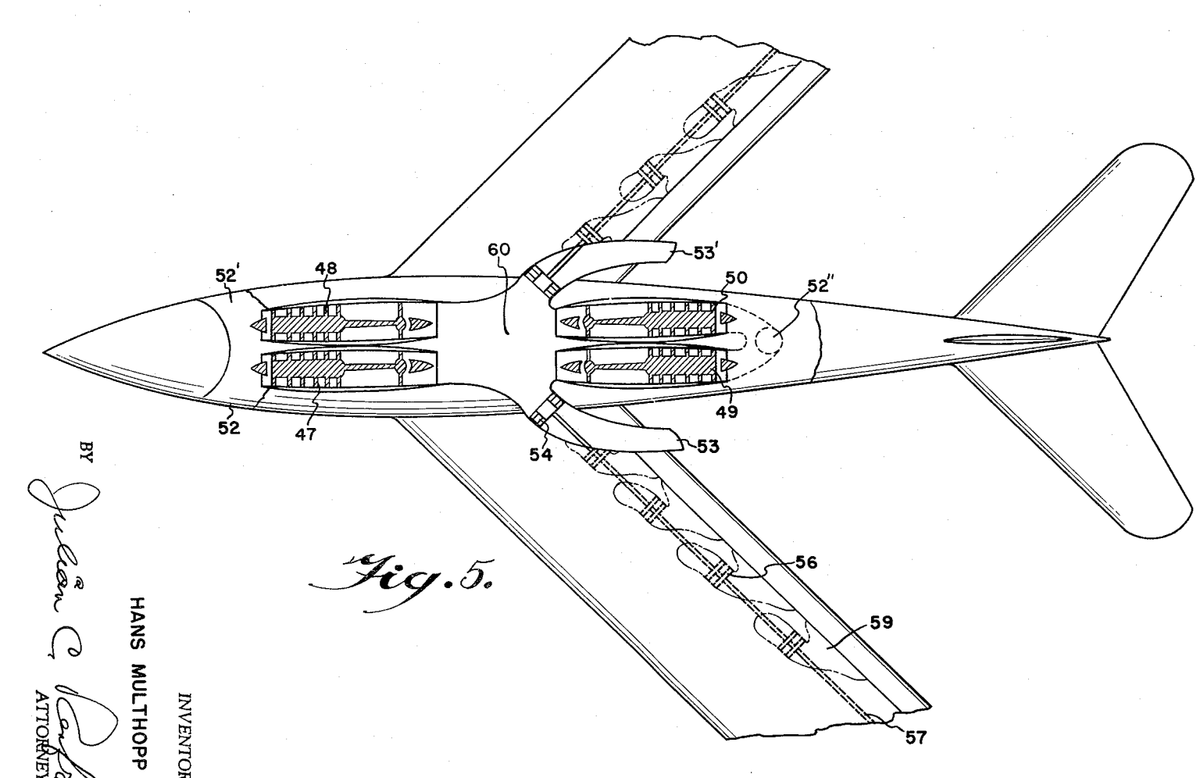
FIGURE 5 is a plan view of another aircraft arrangement showing the use of jet engines in the fuselage mounted in opposed relation.

Referring now to FIGURE 5, an arrangement is illustrated wherein four jet engines 47, 48, 49 and 50 are mounted in operative relationship in the fuselage, with engines 49 and 50 being mounted in opposed relation to engines 47 and 48 respectively. Inlet air for engines 47 and 48 is drawn in through inlets 52 and 52', whereas air for the rearwardly facing engines 49 and 50 is inhaled through inlet 52" preferably located in the lower portion of the fuselage. This embodiment exemplifies an arrangement in which a number of smaller engines are employed in an aircraft fuselage rather than a single large engine, with accompanying advantages such as better weight distribution, etc. The fact that engines 49 and 50 are mounted in a direction opposite to the more conventional direction is no particular handicap, for the exhaust gases emanating from these engines is allowed to mingle in plenum chamber or manifold 60 with the exhaust from engines 47 and 48. The exhaust gases then pass through exhaust duct 53 in such a manner as to drive in rotation the free turbine 54 that is mounted on shaft 57 to drive compressors 56. Exhaust gases also pass through exhaust duct 53' to drive in the opposite wing the counterpart of the foregoing turbine and compressor arrangement. The inlet air for compressors 56 may be obtained through ducts of the type shown at 18 in FIGURE 1 or at 38 in FIGURE 3.

Figure 6:
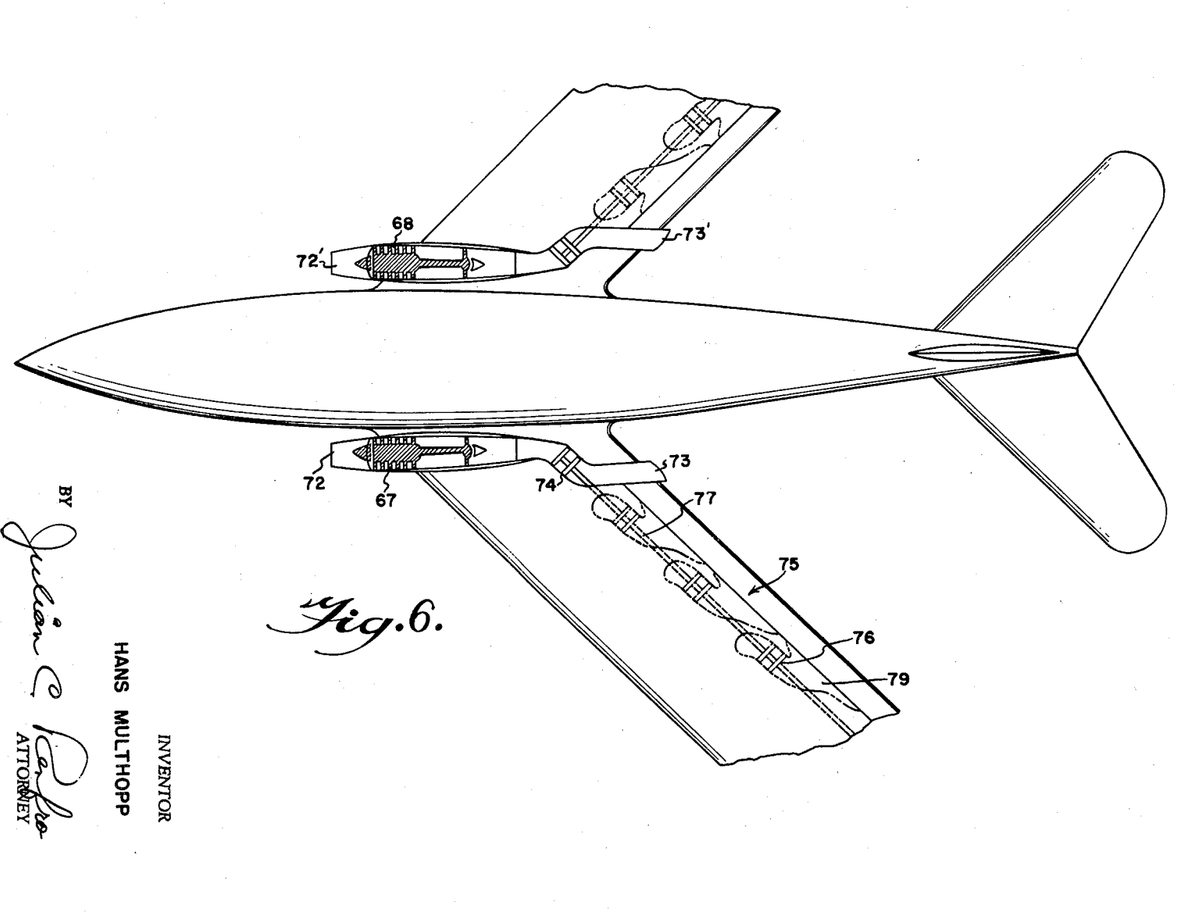
FIGURE 6 is a modification showing the principal power plants placed at inboard locations on the wings.

It is not necessary to have the basic gas generators in the fuselage, for as shown in FIGURE 6, the principal power plants 67 and 68 may be located adjacent the root rib of the wings. These engines inhale inlet air through inlets 72 and 72' respectively, and exhaust through separate exhaust ducts 73 and 73'. The free turbines 74 and 74' are driven solely by the exhaust products emanating from their respective engines, and although a crossover exhaust duct arrangement could be employed so that a single engine could drive both turbines, because of the additional weight involved, such an arrangement is generally not preferred. In a similar manner to previous embodiments, the free turbine 74 drives compressors 76 of compressor arrangement 75, the secondary air being inhaled through appropriate inlet ducts (not shown) and exhausted through slots 79 over the upper surface of the wing flap. An identical arrangement is used in the opposite wing.

Figures 7, 8:
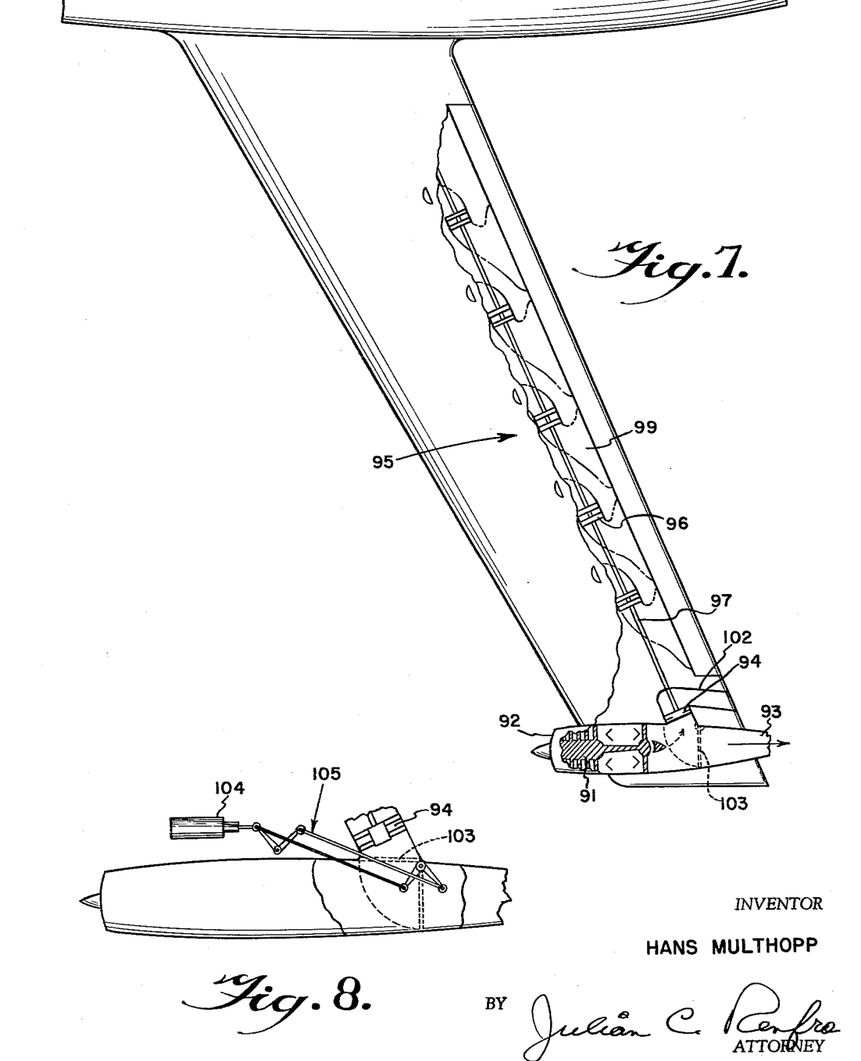
FIGURE 7 is another modification, illustrating the placement of a jet engine in the wing tip of an aircraft.
FIGURE 8 is a fragmentary view illustrating a valving arrangement that can be utilized in the modification according to FIG. 7 to obtain the desired flow of exhaust gases from the engine.

In FIGURE 7 is shown the left wing of an aircraft in which another modification is employed. This arrangement is generally similar to that illustrated in FIG. 6, but instead of the engine 87 being mounted adjacent the root of the wing, it is instead mounted adjacent the wing tip. Inlet air for this engine is taken in through inlet 92 and exhaust duct 93 is provided so that the exhaust products can flow directly rearwardly from the engine. However, so that free turbine 94 may be driven in rotation to drive the compressor arrangement 95, a duct 102 is provided in a position that generally parallels the duct 93 so that the exhaust products from engine 87 (or a desired portion of these products) can be caused to flow through free turbine 94. A valve 103 is disposed adjacent the turbine outlet of the engine, and by the proper positioning of this valve, the exhaust products from the engine can be directed to a desired degree through the free turbine 94. A dual direction actuator 104 under the control of the pilot is operatively connected to valve 103 by an appropriate actuating rod arrangement 105 so that the desired positioning of valve 103 can be accomplished. A valve arrangement of this same general nature may be used with other embodiments, such as with FIG. 6, for example.

Figure 9:
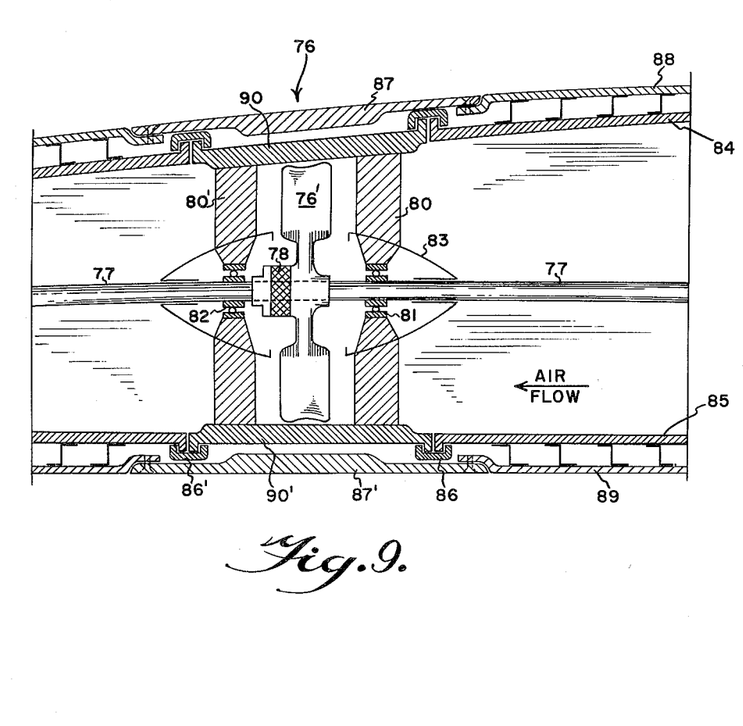
FIGURE 9 is a longitudinal cross-sectional view of a portion of an aircraft wing, but to a larger scale to reveal compressor and shaft details.

FIGURE 9 presents a simplified showing of a typical compressor 76, with a compressor rotor 76' being mounted upon shaft 77 substantially longitudinally disposed in the wing. Upper and lower duct portions 84 and 85 define a generally circular passage through which the air flows to and from compressor 76. A series of inlet stator blades 80 are located on the upstream side of the compressor rotor 76' and outlet stator blades 80' are located on the downstream side. These stator blades not only function to direct the air flowing through the compressor so as to achieve the greatest compression from rotor 76', but also these blades form a support for bearings 81 and 82, disposed in a central portion of the duct. It is in bearings 81 and 82 that the shaft 77 is supported, and in the typical instance, the bearings of the respective compressors of the wing form most, if not all, of the support necessary for shaft 77.

As is known, wings of modern aircraft are designed to deflect or flex to a substantial degree during operation of the aircraft, and so that shaft 77 will not be broken or the compressor rotor moved out of operating position, one flexible coupling 78 is preferably employed in or adjacent each compressor unit 76, or at least every other unit. In this manner, relative deflection of one portion of shaft 77 can occur with respect to another portion without the attitude in which rotor 76' operates being affected to any degree. A streamlined fairing 83 is preferably provided about the radially inner portion of the stator blades to protect the bearings as well as to serve as a guide so that the air can pass as smoothly as possible through the compressor.

As indicated generally in FIG. 3, the upper and lower stator halves join approximately at the mid-point of the compressor, so as to render the rotor as well as the bearings accessible for servicing and replacement. In other words, the upper blades of stators 80 and 80' are affixed about the inner periphery of upper blade supporting member 90 and the lower stator blades are affixed about the inner periphery of lower blade supporting member 90'. Circumferential clamps 86 and 86' are employed to hold the members 90 and 90' in abutting relationship with each other, as well as to hold them in contact with members 84 and 85 on each side of the compressor unit so as to form a smooth continuation of the inlet duct. Access plates 87 and 87' are mounted in upper and lower wing skins 88 and 89, so that by the removal of appropriate flush mounted fittings, either or both of these access plates can be removed so that the clamps 86 and 86' may be disassembled and the desired portion or portions of the arrangements removed. Appropriate stiffening members may be provided intermediate the duct and the wing skins.

As has been seen, the present invention describes a number of different modifications of ducted fan arrangements employable in moderately high speed aircraft, any one of which can be accommodated entirely within the normal contour of the aircraft. As a result, the advantages of a ducted fan engine can be utilized in applications other than in aircraft designed for low speed operation, for the bulkiness of prior art ducted fan arrangements is eliminated, and the advantages of a ducted fan retained.

Additional modifications of the present invention will be apparent to those skilled in the art, but it will be understood that such modifications are within the true purposes and the scope of the following claims.

I claim:

1. A ducted fan arrangement for a jet engine aircraft having wings comprising a plurality of jet engines disposed in the fuselage of said aircraft, a plurality of air compressors arranged at spaced locations along each wing of the aircraft and driven by a common shaft, and a free turbine associated with the compressors of each wing, each of said free turbines being driven by the exhaust products of at least one of said jet engines and arranged to drive the compressors of one wing, forwardly-directed inlet means in said wings, said compressors inhaling air from said forwardly directed inlet means, and exhausting the air rearwardly along the trailing edges of the wings so as to contribute materially to the propulsion of the aircraft.

2. The ducted fan arrangement as defined in claim 1 in which the air from said compressors is exhausted over the upper surface of trailing edge wing flaps to improve the lift characteristics of the wings.

3. The ducted fan arrangement as defined in claim 1 in which at least one of said plurality of jet engines is mounted in opposed relation, with its compressor in a rearwardly facing direction and its exhaust duct arranged in a forwardly facing direction.

4. The ducted fan arrangement as in claim 3 in which said engine mounted in opposed relationship is in longitudinal alignment with respect to a forwardly facing engine, with their exhaust gases arranged to mingle before passing over the free turbines driving said compressors.

5. A ducted fan arrangement for a winged aircraft having a jet engine operatively mounted in each wing comprising a plurality of air compressors at spaced locations along the interior of each wing of the aircraft with the compressors of each wing driven by a common shaft, a free turbine located at one end of each of said shafts and disposed so as to be driven by the exhaust gases of the respective jet engine, forwardly-directed inlet means in said wings, said compressors inhaling air from said forwardly directed inlet means, and exhausting the air rearwardly adjacent the trailing edges of the wings so as to contribute to the propulsion of said aircraft.

6. The ducted fan arrangement as defined in claim 5 in which the air from said compressors is exhausted over the upper surface of trailing edge wing flaps to improve the lift characteristics of the wings.

7. The ducted fan arrangement as defined in claim 5 in which said jet engines are mounted adjacent the wing root.

8. The ducted fan arrangement as defined in claim 5 in which said jet engines are mounted adjacent the wing tip.

9. The ducted fan arrangement as defined in claim 5 in which valve means are provided so that the exhaust gases from said jet engines flowing through said free turbines can be varied.

10. A ducted fan arrangement for a jet engine aircraft having wings comprising a plurality of air compressors rotatably mounted at spaced locations along each wing of the aircraft and driven by a common shaft, forwardly-directed inlet means on said wings, said compressors being arranged to inhale air from forwardly directed inlet means, and to exhaust it along the trailing edge of the wing so as to contribute not only to the propulsion of the aircraft, but also to the lift characteristics of the wing, said compressors being driven in rotation by at least one free turbine mounted on each compressor shaft and rotated by the exhaust gases for the jet engine, each of said compressors comprising at least one rotor stage and a stator stage on each side of said rotor stage, said stator stages being separable into upper and lower removable units, whereby upon the removal of either the upper unit or the lower unit, the rotor associated with said stator units is available for servicing.

11. A ducted fan arrangement for a jet engine aircraft having wings, comprising a plurality of air compressors disposed in spaced relation in each wing of the aircraft with the compressors of each wing driven by a common shaft, and a free turbine driven by the exhaust gases of the jet engine for driving each of said shafts, forwardly-directed inlet means on said wings, said compressors inhaling air from said forwardly directed inlet means, and exhausting the air rearwardly along the trailing edges of the wings so as to contribute materially to the propulsion of said aircraft.

12. The ducted fan arrangement as defined in claim 11 in which the air from said compressors is exhausted over the upper surface of the wing flaps to improve the lift characteristics of the wings.

13. The ducted fan arrangement as defined in claim 11 in which each of said air compressors in the wings is constituted by at least one rotor stage and a stator stage on each side of the rotor stage.

14. A ducted fan arrangement as defined in claim 13 in which the stator stages are separable into upper and lower removable units, whereby upon the removal of either the upper unit or the lower unit, the rotor associated with said stator units is available for servicing.

15. The ducted fan arrangement as defined in claim 11 in which said jet engine is located in the fuselage of the aircraft.

16. The ducted fan arrangement as defined in claim 11 in which the jet engine whose exhaust gases drive the free turbine and compressors of each wing is located in the root of the wing.

17. The ducted fan arrangement as defined in claim 11 in which the jet engine whose exhaust gases drive the free turbine and compressors of each wing is located adjacent the tip of the wing.

References Cited in the file of this patent

UNITED STATES PATENTS

| | | |
|---|---|---|
| 2,501,078 | Newcomb | Mar. 21, 1950 |
| 2,526,941 | Fishbein | Oct. 24, 1950 |
| 2,604,277 | Anxionnaz | July 22, 1952 |
| 2,613,869 | Anxionnaz | Oct. 14, 1952 |
| 2,650,752 | Hoadley | Sept. 1, 1953 |

FOREIGN PATENTS

| | | |
|---|---|---|
| 55,382 | France | Jan. 9, 1952 |